United States Patent Office 3,360,389
Patented Dec. 26, 1967

3,360,389
HYDROGENATED CASTOR OIL-ORGANIC
DIISOCYANATE RHEOLOGICAL AGENT
Fred M. Frank, 61—35 98th St., Rego Park, N.Y. 11374
No Drawing. Filed May 6, 1965, Ser. No. 453,816
11 Claims. (Cl. 106—245)

ABSTRACT OF THE DISCLOSURE

A composition which comprises a hydrogenated castor oil-organic diisocyanate reaction product wherein the diisocyanate comprises from about 2% to about 12% by weight of the reaction product is described herein. This composition has good heat stability at elevated temperatures, e.g. 190° F., and exhibits good thixotropic performance in non-aqueous fluid systems, e.g. paints, the thixotropic properties and stability being further enhanced by including in the composition an emulsifiable polyethylene wax.

---

The present invention relates to an improved rheological product obtained by the reaction of hydrogenated castor oil with a polyisocyanate.

The hydroegnated castor oil-polyisocyanate reaction products of the present invention are characterized by having many advantageous properties, especially that of stability at elevated processing temperatures which renders them particularly suitable for utilization in paint systems.

Another aspect of the present invention is concerned with an improved rheological composition obtained by adding to the reaction product of hydrogenated castor oil and a polyisocyanate an emulsifiable polyethylene wax. The emulsifiable polyethylene wax enhances the thixotropic performance of the hydrogenated castor oil-polyisocyanate reaction product and provides further stability at elevated processing temperatures.

Hydrogenated castor oil in a powdered form has previously been used as a thixotropic rheological agent for oil-base and solvent-base systems such as paints, varnishes, enamels, etc. However, while the hydrogenated castor oil is an efficient thixotropic agent, it has the disadvantage of being unstable at the elevated temperatures developed during grinding or dispersion in the paint mills, with the result that there is seeding or the formation of small grains in the paint; this lack of smoothness is highly undesirable in most suspensions, including those used in protective coating for ink fields. Thus, hydrogenated castor oil has not been fully satisfactory for utilization in paint systems because of its tendency to seed when processed at temperatures of about 140° F. Even if a satisfactory paint is produced below that temperature, when it is stored for some time at temperatures higher than 140° F., the seeds slowly develop. The word "seed" as used herein means the formation of finely divided solid particles which give the paint a poor appearance in the can and reduce the fineness of the grind of the paint when brushed on a substrate or checked on a fineness of grind gage.

It has now been discovered that temperatures at which seeding occurs can be raised to at least about 190° F. by reacting the hydrogenated castor oil with a minor amount of a polyisocyanate. With this improved anti-seeding performance, the castor oil-polyisocyanate reaction product is fully satisfactory for practically all types of paint formulating and processing. It has been further discovered that the addition of emulsifiable polyethylene waxes to the reaction product of hydrogenated castor oil and a polyisocyanate contributes desirable properties to the reaction product including effective pigment suspension, good anti-sag properties, thixotropic body, good brushability and excellent heat stability.

A hydrogenated castor oil such as used in the present invention is commercially available as "Castorwax" from the Baker Castor Oil Company. The quantity of isocyanate reacted with the hydrogenated castor oil is a highly important aspect of this invention. It has been found that the reaction of the hydrogenated castor oil with from about 2% to about 12% by weight of a polyisocyanate, based on the total weight of the reaction product, results in a product having satisfactory heat stability. The use of a polyisocyanate in excess of about 12% completely destroys the thixotropic advantages associated with hydrogenated castor oil, while a level of less than 2% will not provide adequate seeding protection of the hydrogenated castor oil.

The polyisocyanates used in this invention for reaction with the hydrogenated castor oil include aromatic, cycloalkylene, polyalkylene, alkylene and alkilidine polyisocyanates. The aromatic polyisocyanates may be represented by the arylene diisocyanates of the benzene and naphthalene series including the following: Toluene diisocyanate (2,4/2,6), toluene 2,4 diisocyanate, toluene 2,6 diisocyanate, m-phenylene diisocyanate, xenylene 4,4' diisocyanate, naphthalene 1,5' diisocyanate, diphenyl methane 4,4' diisocyanate, 1-chlorophenylene 2,4 diisocyanate, diphenylene ether 4,4' diisocyanate, etc. Other arylene diisocyanates which could be employed include lower alkylene substituted derivatives, halogen substituted derivatives and also alkoxy substituted derivatives.

The polyalkylene polyisocyanates which can be employed include polymethylene diisocyanates such as ethylene diisocyanate, trimethylene diisocyanate, tetramethylene diisocyanate, pentamethylene diisocyanate, etc. The alkylene diisocyanates which can be employed include propylene 1,2 diisocyanate, butylene 1,2 diisocyanate, butylene 1,3 diisocyanate, etc. Also useful are alkilidine diisocyanates such as ethylidene diisocyanate, butylidene diisocyanate, etc. The cycloalkylene diisocyanates which can be used include cyclopentylene 1,3 diisocyanate, cyclohexylene 1,2 diisocyanate, cyclohexylene 1,4 diisocyanate, etc. Further polyisothiocyanates can also be employed.

The emulsifiable polyethylene waxes that are mixed with the reaction product of hydrogenated castor oil and a polyisocyanate are so-called "unmodified" and "modified" emulsifiable polyethylene waxes. The unmodified emulsifiable polyethylene waxes are those having free carboxyl groups and the modified emulsifiable polyethylene waxes are those which have their free carboxyl groups neutralized by reaction with certain materials. The unmodified emulsifiable polyethylene waxes useful in the present invention should have the following properties: a molecular weight of from about 1500 to about 6000, the preferred range being about 2000 to about 2500; an acid number from about 2 to about 50, the range from about 7 to about 50 being particularly effective; a saponification number between about 9 and about 25; a penetration hardness between about 1 and about 6; and a melting point between about 208° F. and about 221° F.

The modified emulsifiable polyethylene waxes are those obtained from the unmodified emulsifiable polyethylene waxes by reacting the free acid groups with certain materials which neutralize the acid groups. Examples of these materials include ethylene diamine, N-butylamine, monoethanolamine, toluene diisocyanate, sodium hydroxide, lithium hydroxide, etc. The reaction of the above materials with the free acid in the unmodified emulsifiable polyethylene waxes can vary from about 5 to about 100% of neutralization with fairly complete neutralization being preferred, as shown by a reduction of the acid number to between 0 and about 5. This reaction to produce the modified emulsifiable polyethylene waxes is a standard acid-base neutralization reaction. This neutralization of the free acid groups causes relatively small changes in the physical properties of the unmodified emulsifiable polyethylene waxes. The use of a modified emulsifiable polyethylene wax rather than the unmodified emulsifiable polyethylene wax is advantageous when a paint composition contains pigments which are sensitive to free acid groups.

The unmodified or modified emulsifiable polyethylene waxes when added to the reaction product of hydrogenated castor oil and a polyisocyanate are highly effective at low concentrations. For obtaining overall thixotropic performance the use of about 20% by weight of the polyethylene wax based on the total weight of the composition gives optimum results. However, satisfactory results can be obtained by using up to about 80% by weight of the emulsifiable polyethylene wax. The emulsifiable polyethylene waxes are most effective when utilized for the purpose of this invention in finely divided form. A preferred technique for making the emulsifiable polyethylene wax into a finely divided form involves dispersing the wax in an organic liquid vehicle at a temperature of about 200° F. to about 220° F. The resulting dispersion can be cooled with or without agitation; if no agitation is used, a homogeneous product is obtained.

Organic liquid vehicles for use in the production of dispersions of the emulsifiable polyethylene waxes include hydrocarbons, these being the preferred organic fluids. Suitable organic fluids include aliphatic, cycloaliphatic, aromatic and terpene hydrocarbons, such as n-heptane, petroleum naphtha, mineral spirits, cyclohexane, benzene, toluene, p-xylene, tetralin, alpha-pinene, p-cymene, etc.; halogenated compounds such as trichloroethylene, n-amyl chloride, chlorobenzene, etc. Also useful are ketones, ethers, polyethers, esters, ether alcohols, alcohols, and polyols.

The reaction product of hydrogenated castor oil with a polyisocyanate is obtained by reacting hydrogenated castor oil with a diisocyanate, preferably toluene diisocyanate, at a temperature of between about 190° F. to about 200° F. The reaction product can also be prepared by first reacting castor oil with the desired diisocyanate and then hydrogenating the resulting reaction product by conventional prior art techniques to obtain a hydrogenated castor oil-diisocyanate reaction product.

The emulsifiable polyethylene wax is preferably blended with the reaction product of hydrogenated castor oil and a diisocyanate. However, preblending the hydrogenated castor oil and the emulsifiable polyethylene wax, at a preferred ratio of about 20 parts by weight of the wax to about 80 parts by weight of the hydrogenated castor oil, and reacting this blend with the diisocyanate also produces a satisfactory rheological composition.

The following example is illustrative of the preparation of a modified emulsifiable polyethylene wax from an unmodified wax.

EXAMPLE 1

600 grams of odorless mineral spirits were heated to 90° C. and into this was dissolved 400 grams of an unmodified emulsifiable polyethylene wax (molecular weight about 2000 and an acid number of about 16.0). The result of diisolving the wax in the mineral spirits was a clear solution. To this solution was added 3.6 grams of ethylene diamine (92%), the amount which chemical calculation had shown was required for complete neutralization of the free acid groups in the polyethylene wax. The mixture was then cooled to room temperature and the product was a soft pasty solid. Essentially this product is a dispersion of the modified emulsifiable polyethylene wax in the solvent used.

The following examples are illustrative of the preparation of the products and compositions of the present invention.

EXAMPLE 2

92.5 parts by weight of powdered hydrogenated castor oil ("Castorwax"), is charged into the reaction kettle and heated to between about 190° F. to about 200° F. to melt the hydrogenated castor oil. Then about 7.5 parts by weight of toluene diisocyanate (2,4/2,6 of 80/20 proportion by weight) is slowly added to the kettle with stirring while maintaining the temperature at between about 190° F. to about 200° F., by cooling if necessary. To determine whether the reaction is complete, cooling of the kettle is discontinued. If the temperature rises above about 200° F. or there is an exothermic reaction, the reaction is not yet complete and cooling is continued. The reaction is completed in about one-half hour.

EXAMPLE 3

The unmodified emulsifiable polyethylene wax of Example 1 is blended with the reaction product of hydrogenated castor oil and toluene diisocyanate of Example 2, by heating 80 parts by weight of the reaction product to about 225° F. and then adding to this product about 20 parts by weight of the unmodified emulsifiable polyethylene wax as rapidly as possible so that the wax will melt when mixed at this temperature. After all the polyethylene wax has been mixed, the blend is heated until a completely homogeneous mixture is obtained. The composition is then allowed to cool. This composition comprises 7.5% by weight of toluene diisocyanate based on the weight of the reaction product and 20% by weight of the emulsifiable polyethylene wax based on the total weight of the composition.

EXAMPLE 4

Following the procedure of Example 2, 98 parts by weight of hydrogenated castor oil was reacted with 2 parts by weight of toluene diisocyanate. 80 parts by weight of this reaction product was then blended with 20 parts by weight of the unmodified emulsifiable polyethylene wax of Example 1. This composition comprises 2% by weight toluene diisocyanate based on the total weight of the reaction product and 20% by weight of the emulsifiable polyethylene was based on the total weight of the composition.

EXAMPLE 5

Following the procedure of Example 2, 96 parts by weight of hydrogenated castor oil was reacted with 4 parts by weight of toluene diisocyanate. 80 parts by weight of this reaction product was blended with 20 parts by weight of the unmodified emulsifiable polyethylene wax of Example 1. This composition comprises 4% by weight toluene diisocyanate based on the total weight of the reaction product and 20% by weight of the emulsifiable polyethylene wax based on the total weight of the composition.

EXAMPLE 6

Following the procedure of Example 2, 88 parts by weight of hydrogenated castor oil was reacted with 12 parts by weight of toluene diisocyanate. 80 parts by weight of this reaction product was then blended with 20 parts by weight of the unmodified emulsifiable polyethylene wax of Example 1. This composition comprises 12% by weight toluene diisocyanate based on the total weight of the reaction product and 20% by weight of the emulsifiable polyethylene wax based on the total weight of the composition.

To determine the improved heat stability of the reaction product of hydrogenated castor oil with specific amounts of toluene diisocyanate and to further evaluate the improved thixotropic performance obtained by blending this reaction product with an emulsifiable polyethylene wax, the following tests were conducted as hereinafter described.

Evaluation procedure

The reaction product of Example 2 and the compositions of Examples 3 through 6 were evaluated in an architectural alkyd gloss enamel. This enamel was formulated at 27% pigment volume content with a long oil oxidizing alkyd resin meeting Federal Specification TT–R–226a Type I. The reaction product of Example 2 and the compositions of Examples 3 through 6 were each added to a sample of the architectural alkyd gloss enamel at a level of 4 lbs. per 100 gallons of paint, a level of use which is known to impart fully satisfactory sag control, viscosity increase and control of pigment settling. The paints were prepared in a high speed disc impeller at about 140° F. to 150° F.

In order to determine whether the reaction product of Example 2 and the compositions of Examples 3 through 6 suppress seeding during dispersion at high temperatures or subsequently under relatively high temperature storage conditions, about ½-pint samples of the paint of each example were heated in an oven for 2 hours at 180° F. and also at 200° F. The samples were then allowed to cool gradually and were checked for anti-seeding development by means of a Hegman fineness of grind gage. The gage readings run from 0–8 with 0 indicating a particle of 4 mils or larger while 8 represents maximum fineness. This determination was used as a means of demonstrating the heat stability characteristics of paint samples having added thereto the product of Example 2 and the compositions of Examples 3 through 6, respectively.

Besides the paint samples of Examples 2 through 6, a paint sample was prepared with only hydrogenated castor oil added to the paint at a level of 4 lbs. per 100 gallons of paint. This sample is identified in Table I below as Example 7.

The anti-sag properties of the paint samples evaluated were determined in the following manner:

The paint sample was mixed with a spatula to insure homogeneity. Thereafter, it is aged for 30 minutes to permit adequate recovery of any viscosity or yield value which may have been temporarily lowered due to the agitation. A representative sample of this composition (3–4 cc.) is puddled at the top of Morest Chart (Form 07, Blank White). A two-inch wide applicator is used to draw down a film (3-mil wet film thickness) the length of the chart. Immediately after the draw-down is completed, two lines are drawn rapidly and completely across the film (with the Morest Chart resting on a flat surface) so as to give two paint-free bands for observation. A metal device known as a sag-liner is desirably used to draw bands having widths of approximately 1/32 inch and 5/32 inch, respectively. Immediately after these bands are drawn, the chart is hung in a vertical position, preferably in a constant temperature (room temperature) and humidity (50% relative humidity) room, for 24 hours or until dry. The films are then rated according to the following system:

*No sag.*—Those films which reveal no evidence whatsoever of paint movement during the 24-hour aging period for either sag line.

*Very slight sag.*—Those films where the paint runs part way across either sag line but fails to contact the other side.

*Slight sag.*—Those films where the paint runs completely across the narrower sag line at some point, but not completely across the broader sag line.

*Sag.*—Those films where some portion of the paint runs down and across both sag lines to touch and become continuous with the other side.

The following test is most useful in quantitatively evaluating the degree of pigment or other fine particle settling in paints or in other compositions during shelf storage. The pigment settling tester consists essentially of a tripod base supporting a central, vertical, tubular sleeve (carrying a graduated linear scale) through which runs a loose fitting plunger (¼ inch diameter). The bottom end of the plunger is fitted with a thin flat disc (1.5 inches in diameter) which is perforated concentrically with 4 holes (¼ inch diameter). The upper end of the plunger is fitted with a pan on which weights can be placed to exert a driving action on the plunger and perforated disc. By the use of this gage, it is possible to systematically probe the layering of pigment which may have settled to the bottom of a can of paint during a given time period. Because of the non-uniform nature of pigment settling, this test is performed in a stepwise fashion through an increase in loading at half-minute intervals. This loading process is continued until the disc touches and comes to rest on the bottom of the can or until the maximum loading of 1000 grams is reached with a layer of pigment still present which resists displacement. The test is run on a one-quart sample of the composition under test in a one-quart commercial paint container (4 inches in diameter and 4.5 inches in height). The paint gage scale is adjusted, with the tripod legs of the gage straddling an empty paint can and resting on the same plane surface on which the can is placed so, that the zero reading of the scale coincides with the position at which the perforated disc is touching the bottom of the can. In running the test, the tripod, with plunger assembly held high up in the tripod sleeve, is placed over the paint can (as described in connection with the scale adjustment). The plunger assembly is then gently lowered manually so that the perforated disc is immersed just below the surface of the paint. At this point, the plunger is released and a stop watch is started to time subsequent loading intervals. The pan at the top of the plunger is loaded according to the following schedule:

| Time (minutes) | Weight Added (grams) | Total Weight (grams) (including plunger assembly) |
|---|---|---|
| 0 | 0 | 100 |
| 0.5 | 100 | 200 |
| 1.0 | 200 | 400 |
| 1.5 | 200 | 600 |
| 2.0 | 200 | 800 |
| 2.5 | 200 | 1,000 |
| 3.0 | | (End of test) |

Readings from the graduated scale of the tubular sleeve (opposite the index line on the plunger rod) are taken immediately before each loading of the plunger pan and at the end of the test. A graphic plot of loading versus height of plunger disc above can bottom gives a good vis-

TABLE I

| Example No. | 2 | 3 | 4 | 5 | 6 | 7 |
|---|---|---|---|---|---|---|
| Fineness of Grind | 7 | 7 | 3 (slight seeds) | 7 | 7 | 0 |
| Viscosity (KU) | 81 | 83 | 86 | 84 | 71 | (1) |
| Sag Control | Very slight sag | No sag | No sag | No sag | Very poor sag | (1) |
| Pigment Settling (after 2 wks. aging) | No settling | No settling | No settling | No settling | Slight settling | (1) |
| 2 hrs. at 180° F | No seeding | No seeding | Seeded | Borderline seeding | No seeding | Seeded |
| 2 hrs. at 200° F | do | do | do | Seeded | do | Do |

[1] Paint not tested due to the presence of considerable seeds.

ual indication of the nature and degree of pigment settling. By the use of this gage, a layer of settled pigment 0.01 inch in thickness becomes measurable. The usual procedure is to run this test on pains or similar compositions which have been shelf aged at room temperature for 2 weeks to 1 month from the time of preparation of the composition.

Detailed test data on the reaction products and compositions of the present invention are presented below in Table I.

As demonstrated in Table I, hydrogenated castor oil is quite unsatisfactory as a suspending and thixotropic agent at elevated temperatures. Since much of the commercial paint processing equipment normally produces such temperatures in the paint being processed, it is essential that the suspending and thixotropic agent be capable of producing a heat stable suspension. The hydrogenated castor oil containing paint (Example 7) proved unsatisfactory at elevated temperatures due to seeding. The hydrogenated castor oil-toluene diisocyanate reaction product containing paint (Example 2) showed up completely satisfactory in the heat stability test at elevated temperatures. The hydrogenated castor oil-toluene diisocyanate reaction product mixed with the emulsified polyethylene wax (Example 3) resulted in optimum overall thixotropic performance. A level of toluene diisocyanate of about 2% by weight (Example 4) provides satisfactory thixotropic performance but not adequate protection against seeding. Thus the level of the diisocyanate should be maintained above about 2% by weight based on the total weight of the reaction product. A level of toluene diisocyanate of about 12% by weight (Example 6) results in poorer thixotropic performance but provides protection against seeding. Therefore, a level of the diisocyanate in excess of about 12% by weight does not give overall satisfactory results.

Since the hydrogenated castor oil (Example 7) developed seeds when processed at 150° F., the paint was re-prepared at low processing temperature (100° F.) and checked for accelerated heat aging heat in the oven at 160° F., 180° F., and 200° F. Example 3 was also tested at these temperatures. In addition a paint sample was tested containing 2 lbs. hydrogenated castor oil blended with 2 lbs. of the unmodified emulsifiable polyethylene wax (Example 8). This latter example was included to determine whether the polyethylene alone can inhibit the seeding of hydrogenated castor oil at high temperatures. The results of the accelerated heat aging test are given below.

TABLE II

| Example No. | 3 | 7 | 8 |
| --- | --- | --- | --- |
| 2 hours at 160° F. | No Seeds | Seeded | Seeded. |
| 2 hours at 180° F. | do | do | Do. |
| 2 hours at 200° F. | do | do | Do. |

As demonstrated in Table II, the emulsifiable polyethylene wax cannot alone inhibit the seeding of hydrogenated castor oil at high temperatures. In order for the emulsifiable polyethylene wax to be effective it must be mixed with the reaction product of hydrogenated castor oil and a diisocyanate.

It is to be understood that changes and variations may be made without departing from the spirit and scope of the invention as defined in the appended claims.

What is claimed is:

1. A composition comprising: (a) a hydrogenated castor oil-organic diisocyanate reaction product, said organic diisocyanate being selected from the class consisting of arylene diisocyanates, polyalkylene diisocyanates, alkylene diisocyanates, alkilidine diisocyanates and cycloalkylene diisocyanates, said diisocyanate comprising from about 2% to about 12% by weight of said reaction product, and (b) an emulsifiable polyethylene wax having a molecular weight from about 1500 to about 6000, an acid number from 0 to about 50, a saponification number from about 9 to about 25, a penetration hardness from about 1 to about 6, and a melting point from about 208° F. to about 221° F., said emulsifiable polyethylene wax being present in an amount up to about 80% by weight based on the total weight of the composition.

2. A composition comprising: (a) the reaction product of hydrogenated castor oil and from about 2% to about 12% by weight toluene diisocyanate, based on the total weight of said reaction product, said reaction being carried out at a temperature from about 190° to about 200° F., and (b) an emulsifiable polyethylene wax having a molecular weight from about 1500 to about 6000, an acid number from 0 to about 50, a saponification number from about 9 to about 25, a penetration hardness from about 1 to about 6, and a melting point from about 208° F. to about 221° F., said emulsifiable polyethylene wax being present in an amount up to about 80% by weight based on the total weight of the composition.

3. A rheological composition according to claim 2 wherein the emulsifiable polyethylene wax has an acid number from 2 to about 50.

4. A rheological composition according to claim 2 wherein the emulsifiable polyethylene wax has an acid number from 0 to 5.

5. A rheological composition comprising: (a) the reaction product of hydrogenated castor oil and from about 2% to about 12% by weight toluene diisocyanate, based on the weight of the reaction product, said reaction being carried out at a temperature of from about 190° to about 200° F., and (b) about 20% by weight of an emulsifiable polyethylene wax, based on the total weight of the composition, said wax having a molecular weight from about 1500 to about 6000, an acid number from 0 to about 50, a saponification number from about 9 to about 25, a penetration hardness from about 1 to about 6, and a melting point from about 208° F. to about 221° F.

6. A rheological composition comprising: (a) the reaction product of hydrogenated castor oil and about 7.5% by weight toluene diisocyanate, based on the total weight of the reaction product, said reaction being carried out at a temperature of from about 190° to about 200° F. and (b) about 20% by weight of an emulsifiable polyethylene wax, based on the total weight of the composition, said wax having a molecular weight from about 1500 to about 6000, an acid number from 0 to about 50, a saponification number from about 9 to about 25, a penetration hardness from about 1 to about 6, and a melting point from about 208° F. to about 221° F.

7. A rheological composition comprising: (a) the reaction product of hydrogenated castor oil and about 4% by weight toluene diisocyanate, based on the total weight of the reaction product, said reaction being carried out at a temperature from about 190° to about 200° F. and (b) about 20% by weight of an emulsifiable polyethylene wax, based on the total weight of the composition, said wax having a molecular weight from about 1500 to about 6000, an acid number from 0 to about 50, a saponification number from about 9 to about 25, a penetration hardness from about 1 to about 6, and a melting point from about 208° F. to about 221° F.

8. A rheological composition according to claim 6 wherein the emulsifiable polyethylene wax has a molecular weight of about 2000 and an acid number of about 16.

9. A rheological composition according to claim 7 wherein the emulsifiable polyethylene wax has a molecular weight of about 2000 and an acid number of about 16.

10. A composition selected from the group consisting of a paint and varnish product, and a rheological agent consisting essentially of hydrogenated castor oil-organic diisocyanate reaction product, said organic diisocyanate comprising about 2% to about 12% by weight of said reaction product and said organic diisocyanate selected from the class consisting of arylene diisocyanates, polyalkylene diisocyanates, alkylene diisocyanates, alkilidine diisocyanates and cycloalkylene diisocyanates.

11. A composition selected from the group consisting of a paint and varnish product, and a rheological agent consisting essentially of hydrogenated castor oil-toluene diisocyanate reaction product, said diisocyanate comprising about 2% to about 12% by weight of said reaction product.

References Cited

UNITED STATES PATENTS

| | | | |
|---|---|---|---|
| 2,943,947 | 7/1960 | Szukiewicz | 260—18 |
| 2,966,472 | 12/1960 | Fiel | 260—18 |
| 3,021,289 | 2/1962 | Muller | 260—18 |
| 3,144,348 | 8/1964 | Millington | 106—271 |
| 3,262,952 | 7/1966 | Smith | 264—303.6 |

JULIUS FROME, *Primary Examiner.*